(12) United States Patent  
Baker

(10) Patent No.: US 8,038,204 B1  
(45) Date of Patent: Oct. 18, 2011

(54) REPLACEMENT INTERCHANGEABLE GRILLE FOR VEHICLES

(76) Inventor: Scott Bradley Baker, Sherman Oaks, CA (US)

(*) Notice: Subject to any disclaimer, the term of this patent is extended or adjusted under 35 U.S.C. 154(b) by 0 days.

(21) Appl. No.: 11/395,283

(22) Filed: Mar. 31, 2006

Related U.S. Application Data

(60) Provisional application No. 60/696,941, filed on Jul. 5, 2005.

(51) Int. Cl.
  *B60R 19/52* (2006.01)
(52) U.S. Cl. ..................... 296/193.1; 296/1.08
(58) Field of Classification Search ............... 296/193.1, 296/1.08; 293/115; 180/68.6, 68.1; D12/163, D12/164, 165, 166, 170, 171, 216; 193/115
  See application file for complete search history.

(56) References Cited

U.S. PATENT DOCUMENTS

| | | | | |
|---|---|---|---|---|
| D412,310 S | * | 7/1999 | Cicansky | D12/216 |
| 6,027,150 A | * | 2/2000 | Flewitt et al. | 293/115 |
| 6,405,819 B1 | * | 6/2002 | Ohkura et al. | 180/68.1 |
| D495,980 S | * | 9/2004 | Marchese et al. | D12/163 |
| D512,350 S | * | 12/2005 | Cicansky | D12/163 |
| 2002/0096378 A1 | * | 7/2002 | Kobayashi | 180/68.6 |
| 2005/0006928 A1 | * | 1/2005 | Diehl et al. | 296/193.1 |
| 2005/0029028 A1 | * | 2/2005 | Steinmacher | 180/68.6 |
| 2005/0217911 A1 | * | 10/2005 | Cheng | 180/68.6 |
| 2006/0119115 A1 | * | 6/2006 | Filip et al. | 293/115 |
| 2006/0181088 A1 | * | 8/2006 | Cobble et al. | 293/115 |

* cited by examiner

*Primary Examiner* — Jason S Morrow  
(74) *Attorney, Agent, or Firm* — Colin P. Abrahams

(57) ABSTRACT

A replacement grille for a vehicle which replaces an original grille of the vehicle comprises a frame component comprising an outer frame defining a space, at least one design component received within the space of the frame, and a connector for connecting the design component to the frame component.

15 Claims, 12 Drawing Sheets

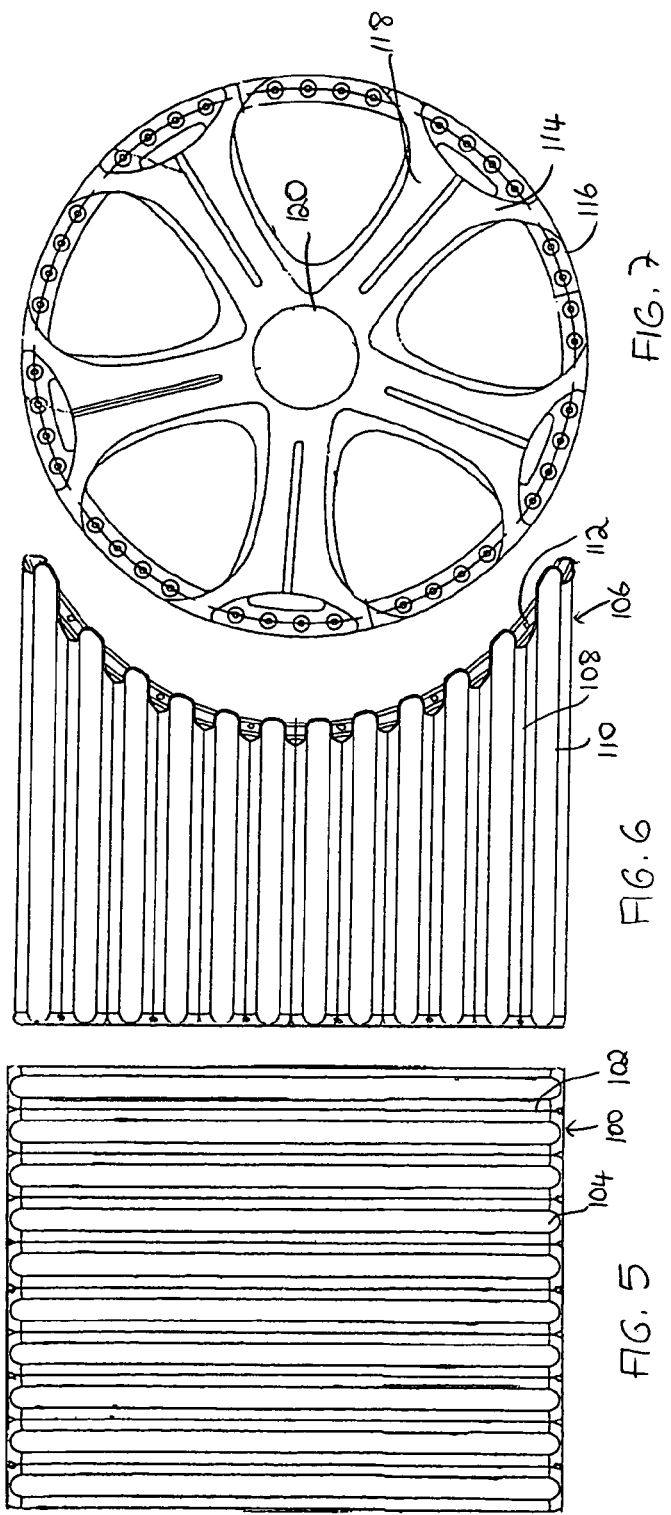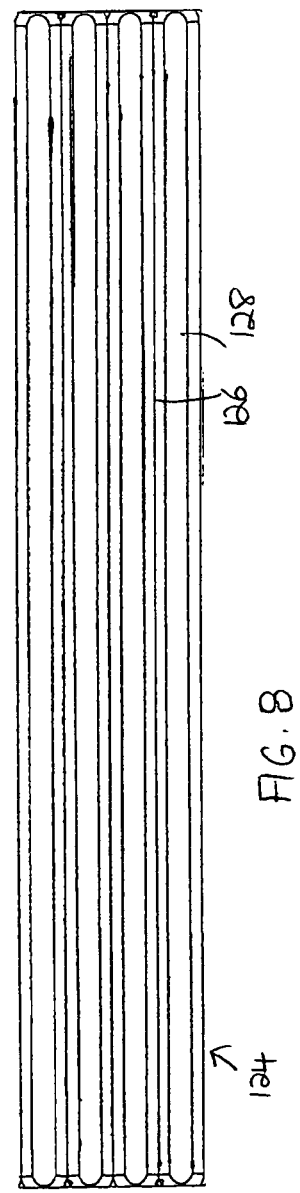

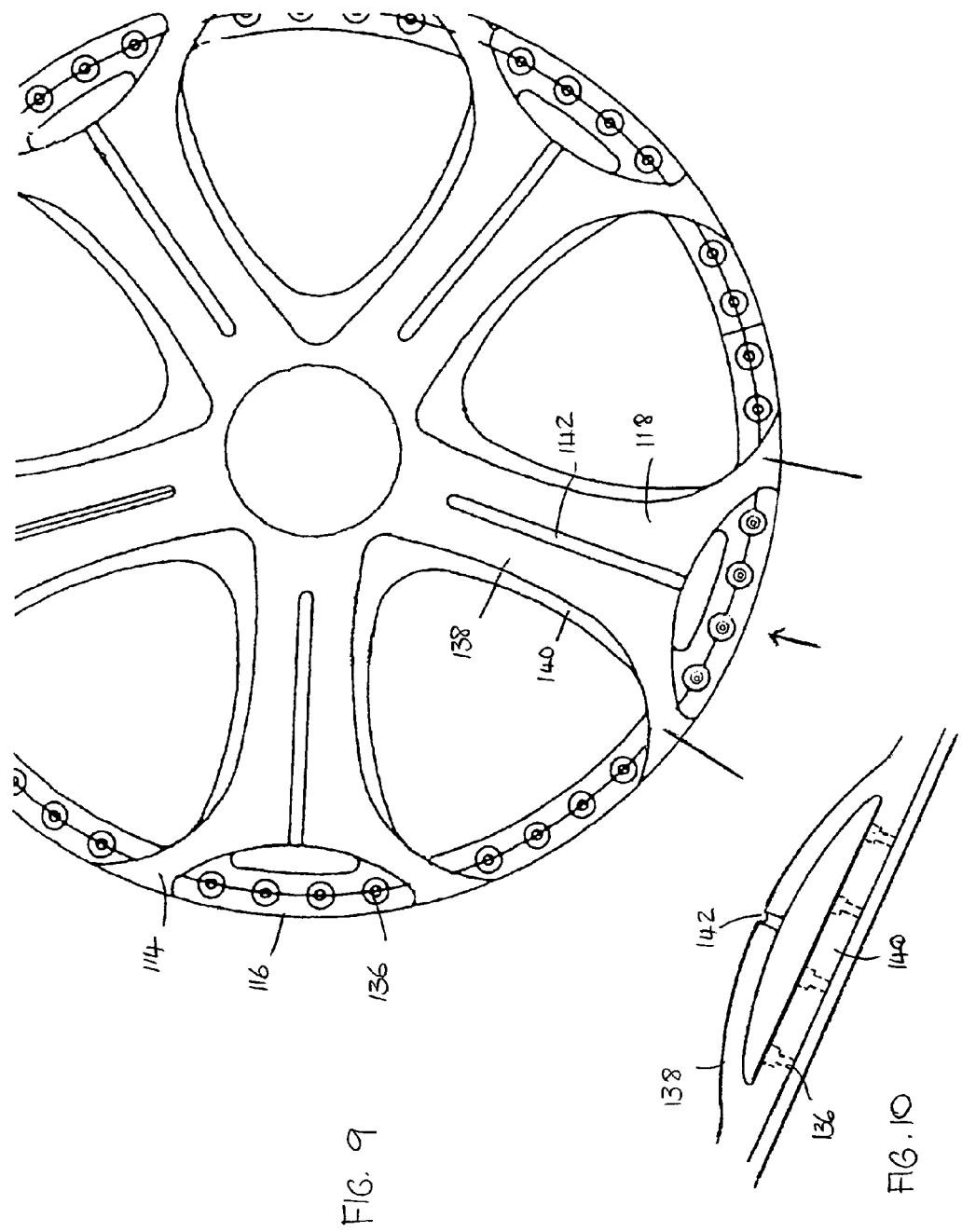

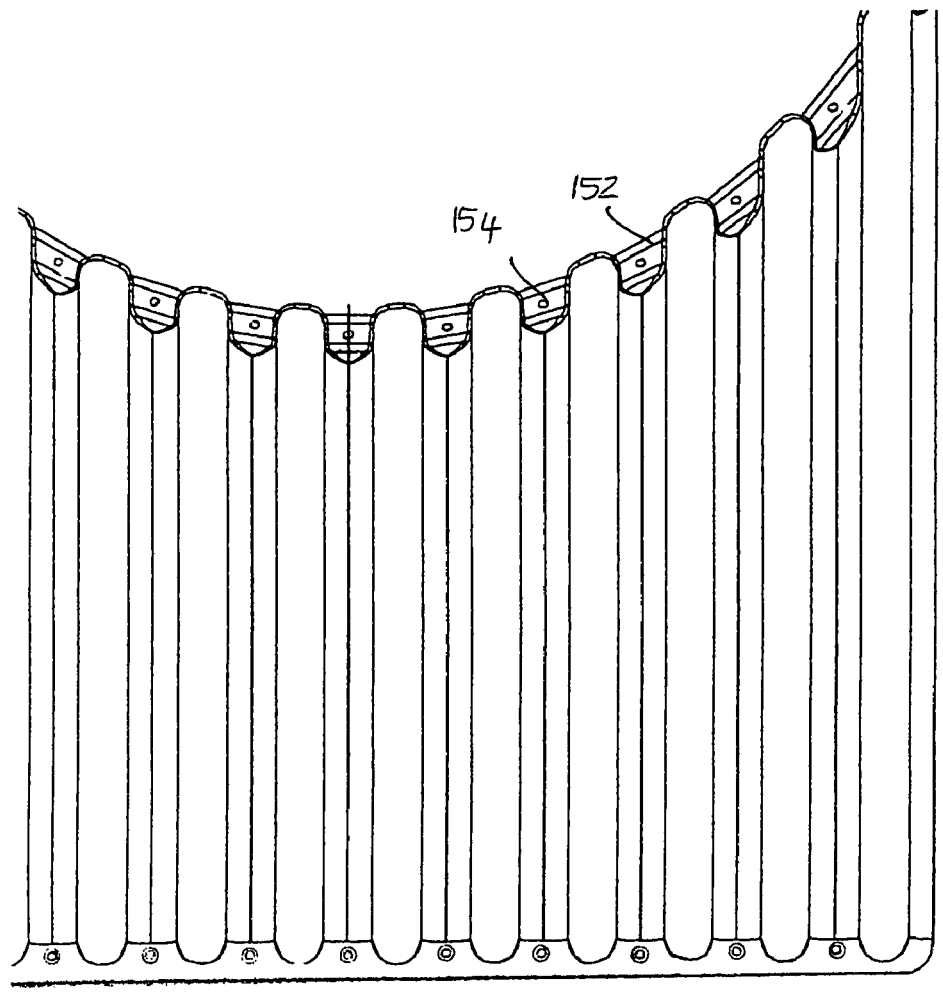
FIG. 11
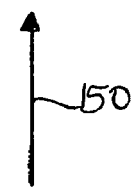
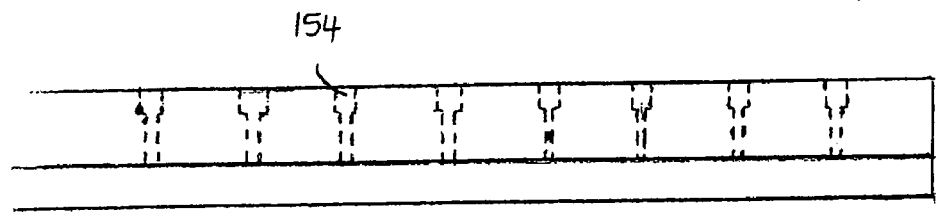
FIG. 12

REPLACEMENT INTERCHANGEABLE GRILLE FOR VEHICLES

REFERENCE TO RELATED APPLICATIONS

This application claims the benefit of U.S. Provisional Patent Application No. 60/696,941 filed Jul. 7, 2005. The contents of this provisional patent application are incorporated by reference in their entirety.

BACKGROUND OF THE INVENTION

This invention relates to an interchangeable design component grille, typically used for vehicles. In one aspect, the invention relates to a grille for cars and/or trucks, and more particularly to a grille assembly comprising a number of interchangeable, decorative design components, all or some of which can be used in various combinations and matches so as to create a reasonably customized grille for the vehicle.

Most vehicles will typically comprise a conventional grille which is designed as a complete, single unit, and integrated into the overall design of the vehicle as determined by the design team at the facility or other place of the manufacturer of the vehicle. The purchase of a particular vehicle or truck automatically includes the specifically designed grille for use thereon, and a purchaser has little or no option during the purchasing process of changing the appearance or any aspect of the grille design.

However, certain companies have from time to time, and especially for very popular vehicle models, designed alternative grilles that are different from those of the original manufacturer's design, and which can be incorporated onto the vehicle by substituting or replacing the grille which came with the original vehicle. However, these opportunities are in practice very limited, and will typically comprise replacing one grille in its entirety with another substitute grille in its entirety.

As such, it will be appreciated that the variety of design and decoration options for a grille on a vehicle are limited, or even non-existent, and when any substitute is available, it is usually a complete part, requiring the total removal of the standard grille and the installation of a different grille design in its place.

SUMMARY OF THE INVENTION

In one aspect, this invention relates to a replacement grille for a vehicle, such as a car or truck, which supplants an existing grille, the replacement grille of the invention being comprised of a plurality of components which can be assembled with respect to each other so as to form a customized grille according to the preferences of the user.

In one aspect, the replacement grille will comprise a plurality of components, wherein each component may have a different appearance, ornamentation, shape, contour, texture or other features which vary from one such component to another, so that by selecting the combination of desired components, the totality of the replacement grille can be assembled such that it will be customized based on the user's requirements and preferences.

In another aspect, the invention provides a replacement grille for a vehicle such as a car or truck, the replacement grille being assembled from selected design components, the components being configured with respect to each other such that a "mix and match" construction between the components can be utilized so as to configure a customized replacement grille for the vehicle.

In one embodiment of the invention, the customized replacement grille of the invention may comprise a peripheral frame or template, which in one form may be shaped and dimensioned so as to fit in a space created by the removal of the grille which formed part of the original vehicle, and a series of differently shaped insert design components which can be secured within the frame, the insert components being of varying shape and sizes, and fitting together in a jigsaw puzzle-like fashion so as to substantially fill a space created by the frame, or a significant part thereof.

The frame and/or any of the components may be constructed so as to be mirror images of other components so that a lateral symmetry of the customized replacement grille can be achieved. The frame or any of the components which fit therein may have different contours, surfaces, textures, color, or patterns integrated therein. Further, they may be chrome-plated or comprised of carbon fiber, or any other material which provides an interesting, different and/or selectively customized appearance for the grille.

According to one aspect of the invention, there is provided a replacement grille for a vehicle, the replacement grille for replacing an original grille of the vehicle, the replacement grille comprising: a frame component comprising an outer frame defining a space; at least one design component received within the space of the frame; and connection means for connecting the design component to the frame component.

Preferably, the frame component has a shape which is selected from square and rectangular. The frame may comprise an outer edge and an inner edge, the inner edge having an inwardly extending flange along at least a portion thereof, the inwardly extending flange providing a connector base for connecting the design component to the frame.

In one form, the replacement grille comprises the frame component, a first lateral design component within the frame component, and a second lateral design component within the frame component. The replacement may further comprises a third central design component located in a space defined by the first and second lateral design components.

Conveniently, at least one of the frame and/or design components are plated with chrome, the design component has a selected color, and/or different design components have differently selected colors.

Preferably, the design component comprises an inner flange along its entire length, the inner flange having a series of connector holes. Further, the design component may have an outer flange, the outer flange having mounting holes corresponding to those mounting holes in the frame component for securing the component to the frame.

In one embodiment, the frame component has mounted therein an inner design component, the inner design component generally having horizontal slats separated by spaces. The frame component and design components may be secured to each other by securing brackets, or by mounting screws.

BRIEF DESCRIPTION OF THE DRAWINGS

In the drawings:

FIG. 5 is a front view of a design component for a grille in accordance with one aspect of the invention;

FIG. 6 is another front view of a design component for a grille in accordance with one aspect of the invention;

FIG. 7 is a still a further front view of a design component for a grille in accordance with one aspect of the invention;

FIG. 8 is yet a further front view of a design component for a grille in accordance with one aspect of the invention;

FIG. 9 is a detailed view illustrating one of the design components of a grille in accordance with the invention;

FIG. 10 is an end view of the component shown in FIG. 9 of the drawings;

FIG. 11 is a detailed view of the design component shown in FIG. 6 of the drawings;

FIG. 12 is an end view of the design component shown in FIG. 11 of the drawings;

DETAILED DESCRIPTION OF THE INVENTION

As illustrated herein, the invention comprises an interchangeable replacement grille, wherein the standard grille on a vehicle, such as a car or truck, is removed and replaced with a customized replacement grille constructed and configured in accordance with the preferences of the user of the vehicle. Typically, but not necessarily, the interchangeable replacement grille in accordance with the invention will comprise a frame member, generally of the size, shape and dimension representing the outer periphery of the standard original frame. The frame may define a space in which one or more design components can be installed or inserted, so as to create an appearance which is customized and different from that of the original standard grille.

Figure 1:
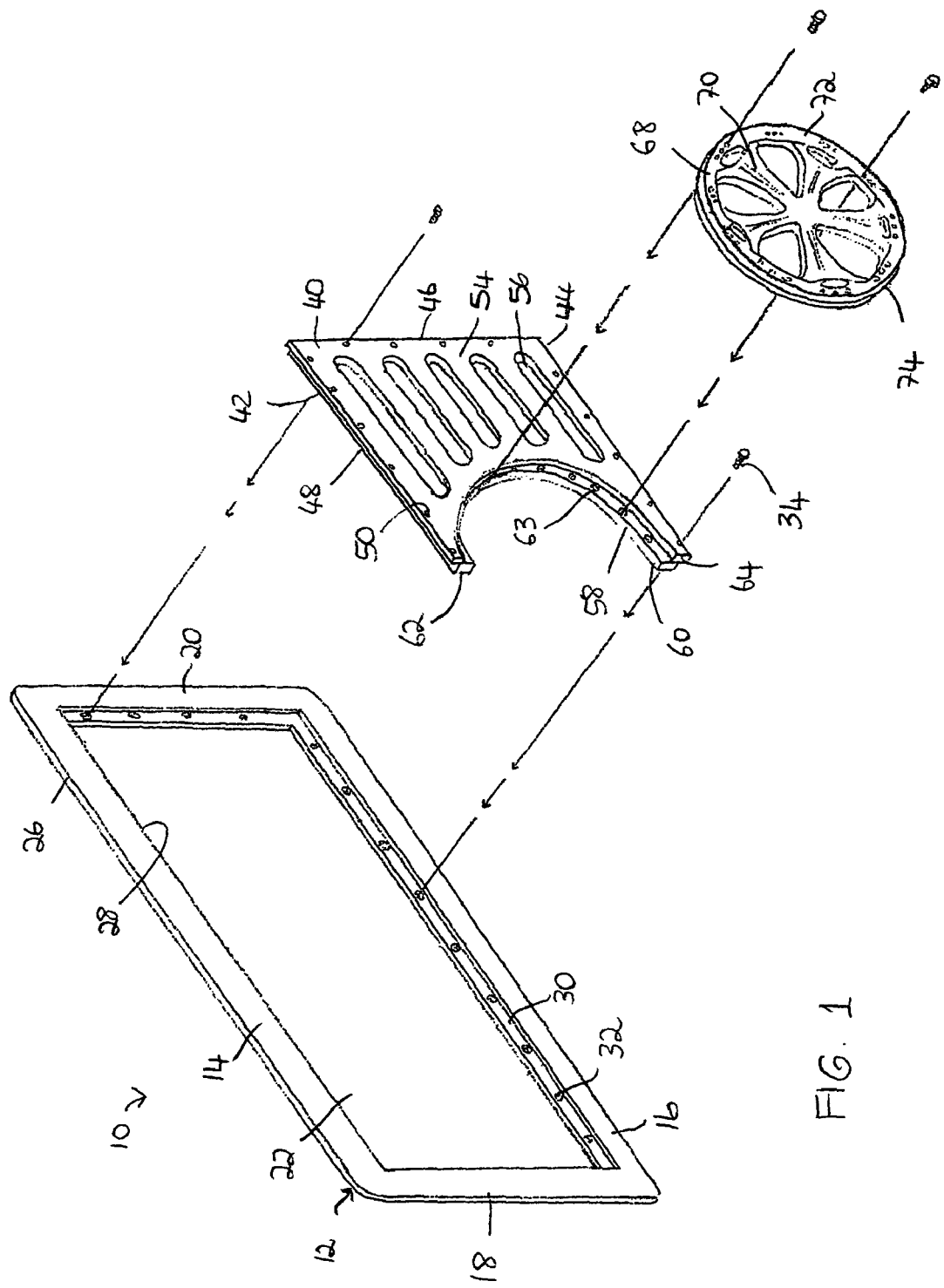
FIG. 1 is an exploded perspective view of components of an interchangeable grille in accordance with one aspect of the invention.

The overall concept and general elements of the invention can be seen with reference to FIG. 1 of the drawings. FIG. 1 of the drawings shows an interchangeable replacement grille 10, including a rectangular grille frame 12. The grille frame 12 has longer upper and lower arms 14 and 16, and shorter side arms 18 and 20, all of which are connected or integrated to form the generally rectangular grille frame 12. It will, of course, be appreciated that the rectangular frame 12 shown in FIG. 1 is but one of potentially many differently configured frames. Depending upon the shape of the original or standard grille which the interchangeable replacement grille 10 of the invention is intended to supplant, the grille frame 12 will have different dimensions, and may be different types of rectangles, a square, or any other shape as would be appropriate. In general, the grille frame 12 is designed so as to insert and extend to the periphery of the space or void which has been left by the removed standard grille, which it replaces.

As shown in both FIGS. 1 and 2, the grille frame 12 defines a space 22, which is adapted and configured to be filled with different types of design components as will be described.

The grille frame 12 further defines an outer edge 26 and an inner edge 28. The outer edge 26 will be immediately adjacent that portion of the vehicle which receives the frame. The inner edge 28 is especially configured so as to receive one or more design components, to be described.

The inner edge 28 of the grille frame 12 comprises a peripheral flange 30 which extends all or part of the way around the inner edge 28 of the grille frame 12. The peripheral flange 30 has a plurality of more or less equidistantly spaced mounting holes 32, the mounting holes 32 being designed to receive a mounting screw 34, the mounting screw 34 and holes 32 in practice contributing towards the securement of a design component within the space 22 of the grille frame 12.

An interchangeable design component 40, as shown in FIG. 1, is configured so as to partially fill the space 22. The design component 40 comprises an upper edge 42 which will fit against inner edge 28 of the grille frame 12. Similarly, a lower edge 44 of the design component 40, and a side edge 46, fits with and is fastened to, the inner edge 28 on that part of the frame corresponding to the side arm 20 and the lower arm 16 respectively.

It will be noted that the interchangeable design component 40 has along its upper, lower and side edges, 42, 44 and 46 respectively, an outwardly extending flange 48, the flange 48 including a number of substantially equi-spaced mounting holes 50. The spacing of the mounting holes 50 on the flange 48 will correspond to the spacing of the holes 32 along the peripheral flange 30 of the grille frame 12 to ensure registry of the holes for installation.

The interchangeable design component 40 is inserted within the space 22, and the flange 48 of the upper, lower and side edges 42, 44 and 46 respectively, engage the peripheral flange 30 of the grille frame 12. The mounting holes 50 register with the holes 32, and mounting screws 34, in appropriate numbers, are used to firmly secure and connect the interchangeable design component 40 to the grille frame 12.

The design component 40 comprises a body portion 54 with a series of elongate apertures 56 arranged generally parallel and substantially horizontally to each other on the body portion 54. The elongate apertures 56 are not only designed to be aesthetically pleasing, but may also facilitate airflow through the grille to the engine, to facilitate appropriate cooling of the engine as is well known.

The design component 40 further comprises a substantially semi-circular inner edge 58, the semi-circular edge 58 having a rounded flange 60. The flange 60 has a series of holes 62 arranged more or less equidistantly therealong. The design component 40 further comprises upper and lower internal locking mounting tabs 62 and 64, and these tabs 62 and 64 are designed, as may be appropriate, for engaging another design component which may be substantially a mirror image of the design component 40, or engaging some intermediate design component. In any event, it should be understood that these locking mounting tabs 62 and 64 are designed so as to more securely fasten the design components within the grille frame 12 to enhance the connection between the various components.

Also shown in FIG. 1 is a circular design component 68 comprising, in this case, five radial spokes or arms 70 and a circular periphery 72. The periphery 72 has a circular flange 74, with a series of equidistantly spaced holes therealong, the circular flange 74 in use engaging with and connecting to the circular flange 60 located on the interchangeable design component 40.

In assembling the interchangeable replacement grille of the invention as illustrated in FIG. 1, the grille frame 12 must first be attached to the vehicle in the space created by removal of the original grille. Alternatively, and depending upon the nature of the various components and the original grille, the interchangeable replacement grille of the invention may be assembled in its entirety prior to attachment to the vehicle. In any event, the grille frame 12 is assembled, as appropriate, and the interchangeable design component 40 installed against the arm 20 on the one side of the space 22 created by the grille frame 12. Thereafter, a design component (similar to those shown in FIGS. 14 and 16 of the drawings), comprising a mirror image of the design component 40, is installed on the other side of the space 22, against the arm 18. The internal locking mounting tabs 62 and 64 of the design component 40 and its mirror image installed within the space 22 are fixed together as is appropriate according to the design and configuration thereof. Thereafter, the circular design component 68 is installed in the circular space created by the two design components, such that the circular flange 74 engages with the circular flange 60 of the interchangeable design component 40.

Thus, with reference to FIG. 1 of the drawings, a customized, interchangeable replacement grille of the invention comprises a frame and three internal design components, the three internal design components being the two side design components and the circular design component which fits into the space therebetween.

Figure 2:
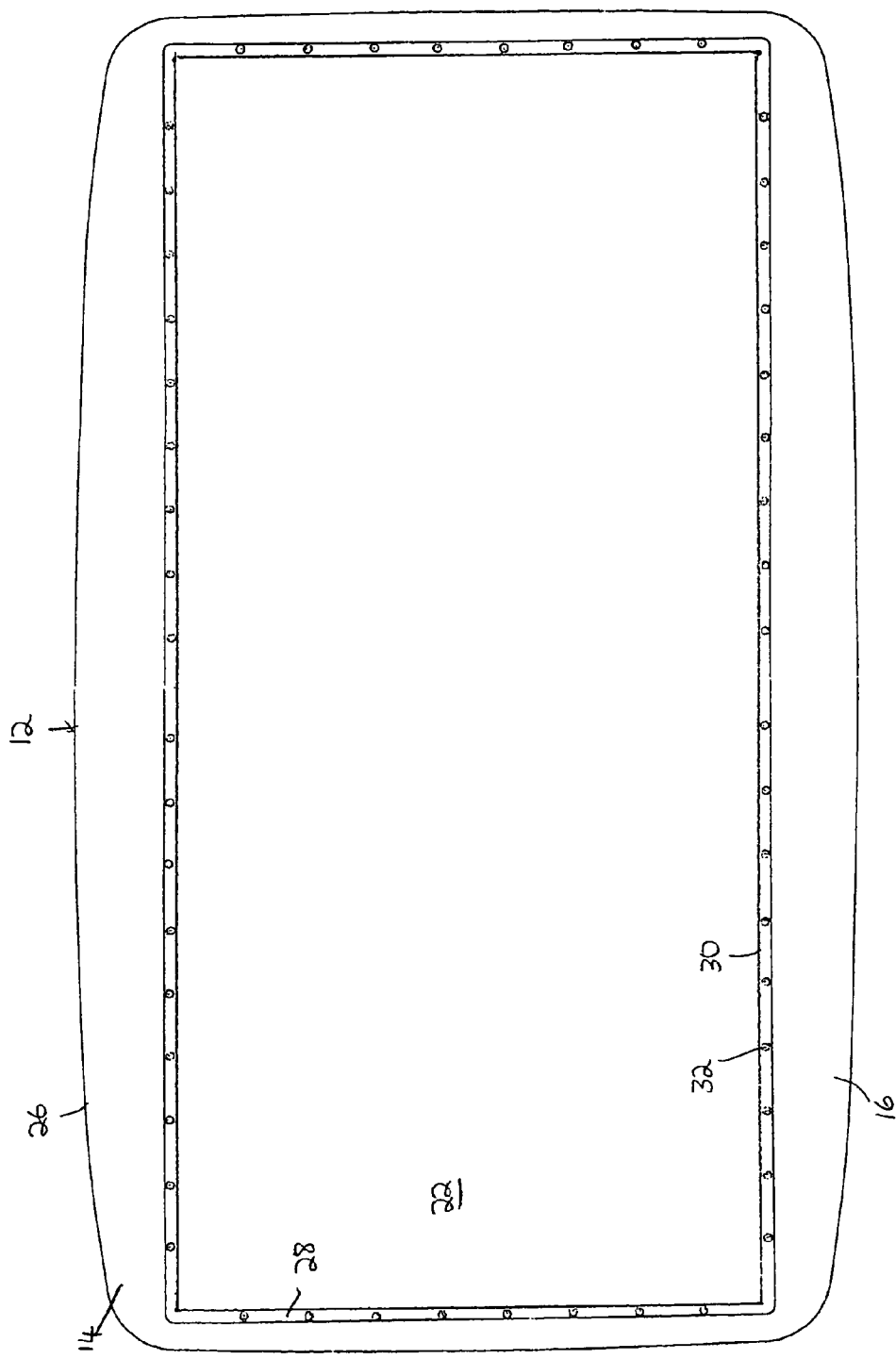
FIG. 2 is a front view of a frame of an interchangeable grille in accordance with one aspect of the invention.

In FIG. 2 of the drawings, there is shown a front view of the grille frame 12 similar to that shown in FIG. 1. The grille frame 12 in FIG. 2 has an outer edge 26 of the arms 14 and 16 which are slightly curved, providing a less rigidly rectangular shape to the frame. Otherwise, it will be noted that the frame 12 generally defines the space, and has an inner edge 28 including the peripheral flange 30 and the various holes 32 by means of which design components may be secured thereto, as already described with reference to FIG. 1 of the drawings.

Figure 3:
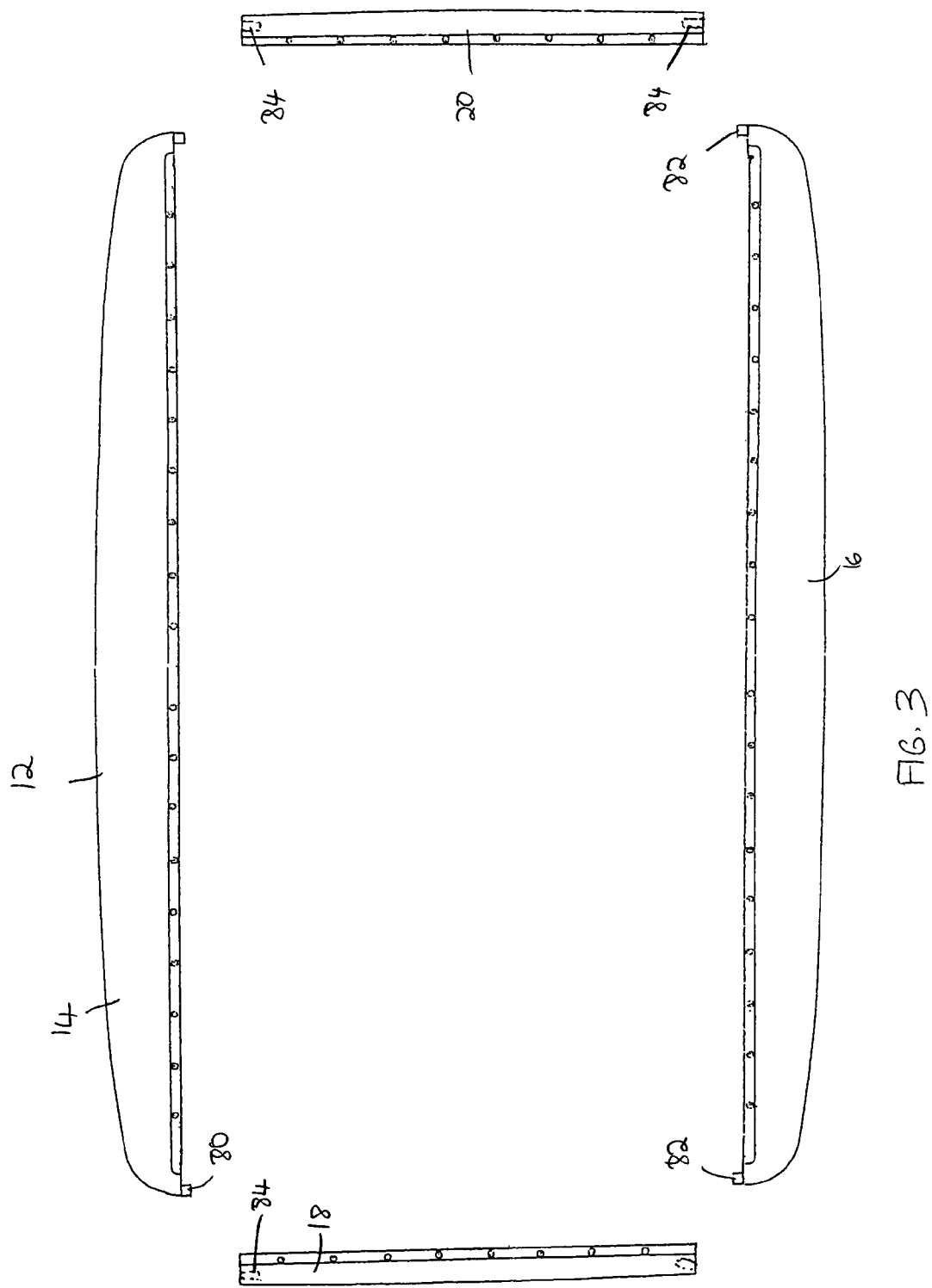
FIG. 3 is a view similar to that in FIG. 2 of the drawings, showing a variant of a frame in the unassembled condition.

In FIG. 3 of the drawings, there is shown a frame 12 of generally identical shape to that shown in FIG. 2 of the drawings, but which comprises a series of discrete arms which can be assembled and fixed to each other. The upper arm 14 has near the edges thereof a pair of protruding tabs 80, while the lower arm 16 also has a pair of protruding tabs 82. Each of the side arms 18 and 20 has an end including an aperture 84, the aperture 84 being designed to receive and securely accommodate the tabs 80 and 82. The tabs 80 and 82 snap into the apertures 84 for a firm connection, but this connection may be appropriately enhanced and strengthened using glue, bolts, or any other additional fastening mechanisms for connecting the horizontal arms 14 and 16 with the vertical arms 18 and 20. Moreover, it should be understood that the embodiment shown in FIG. 3 whereby the grille frame 12 is assembled by means of the various arms locking together is but one example of a frame in accordance with the present invention. It will be appreciated that the frame 12 may be formed as an integral unit, such as that shown in FIG. 2, or assembled in any other convenient way which may be useful for packing and shipping of the frame and other components, and the subsequent easy assembly thereof by the user.

Figure 4:
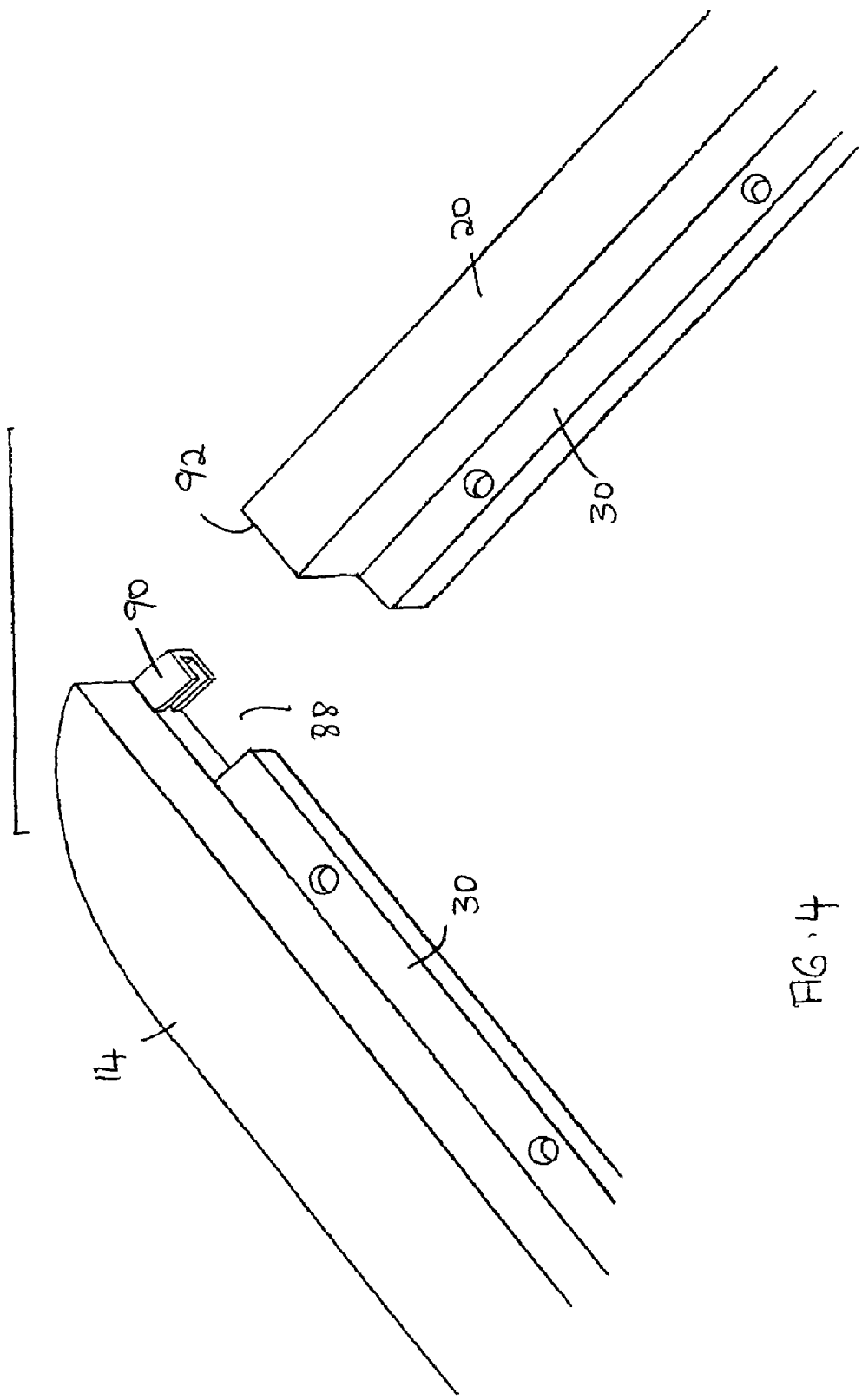
FIG. 4 is an exploded view showing a detail of a connection for the parts of a frame in accordance with another embodiment of the invention.

FIG. 4 of the drawings shows yet a further example wherein an upper horizontal arm 14 may be secured to the side arm 20. In the embodiment shown in FIG. 4, the peripheral flange 30 on the arm 14 does not extend all the way to the end, but a space 88 is formed, and a U-shaped tab 90 constructed. The U-shaped tab 90 fits in a corresponding and registering aperture in the end 92 of the arm 20, and the space 88 accommodates a portion of the arm 20. Once assembled, the peripheral flanges 30 on the arms 14 and 20 respectively will abut against each other and form the continuous flange as a basis for securement of the design components, as already described with reference to FIG. 1 and other drawings.

With reference to FIGS. 5 to 8, there is shown a series of design components of different shapes and configurations. These will be briefly described hereunder, but it is essential for a proper appreciation of the breadth of the invention to understand that the invention is not in any way limited to those configurations illustrated in FIGS. 5 to 8, or, indeed, any of the other drawings. As a matter of fact, the essence of the invention is the ability to customize a grille using differently shaped and configured components, and the components may by the very nature of the invention therefore be of a very large number of shapes, sizes, appearances, textures, and other characteristics.

FIG. 5 shows a generally square grille component 100 comprising a series of slats 102 interspersed with spaces 104. FIG. 6 shows a component 106 similar in overall shape, but otherwise different from the design component 40 illustrated in FIG. 1. The grille 106 shown in FIG. 6 comprises a series of horizontal slats 108 and interspersed spaces 110, and a curved edge 112 designed to engagingly receive a circular design component, as shown in FIG. 7 of the drawings. FIG. 7 shows the circular design component 114 having an outer periphery 116, five radial spokes 118, and a central hub 120. The periphery 116 is configured so as to be connected to the curved edge 112 in a grille 106, such as illustrated in FIG. 6 of the drawings.

FIG. 8 shows yet another grille 124 which is of elongate, rectangular shape, and comprised of a series of horizontal slats 126 defining spaces 128 therebetween.

The various design components shown in FIGS. 5 to 8 may be typical and more common amongst those which could be used in accordance with the invention, but the benefits and advantages of the invention are such that, as already mentioned above, but repeated once more to emphasize the point, an almost infinite number of different designs and appearances may be used in configuring the design components.

With reference to FIG. 9, there is shown a more detailed view of the grille component 114 as illustrated in FIG. 7 of the drawings. The periphery 116 comprises a plurality of apertures 136, which would typically be used for mounting screws for connecting the component 114 to an adjacent component, such as grille 106 illustrated in FIG. 6 of the drawings. The radial spokes 118 comprise, as is best illustrated in FIG. 10 of the drawings, (which is an end view of the grille component 114 in FIG. 9), an outer curved portion 138, and a flat inner portion 140. The outer curved portion 138 has a decorative channel 142 along its length to provide contour and an aesthetically pleasing appearance to the component 114. It will be seen in FIG. 10 that apertures 136 are designed and shaped so as to receive a mounting bolt, so that the component 114 can be secured to a flange or other connectable component of the adjacent grille.

FIGS. 11 and 12 of the drawings, also show more detailed views of the grille 106 shown in FIG. 6, FIG. 12 represents an end view, looking in the direction of arrow 150 and the grille 106 includes a flange 152 having holes 154 for receiving mounting screws whereby the components, such as those illustrated in FIG. 7 of the drawings, may be secured thereto. FIG. 12 also shows the shape and configuration of the apertures or holes 154 for effecting the mounting and connection to the grille frame 12 via flange 30 and holes 32.

Figure 13:
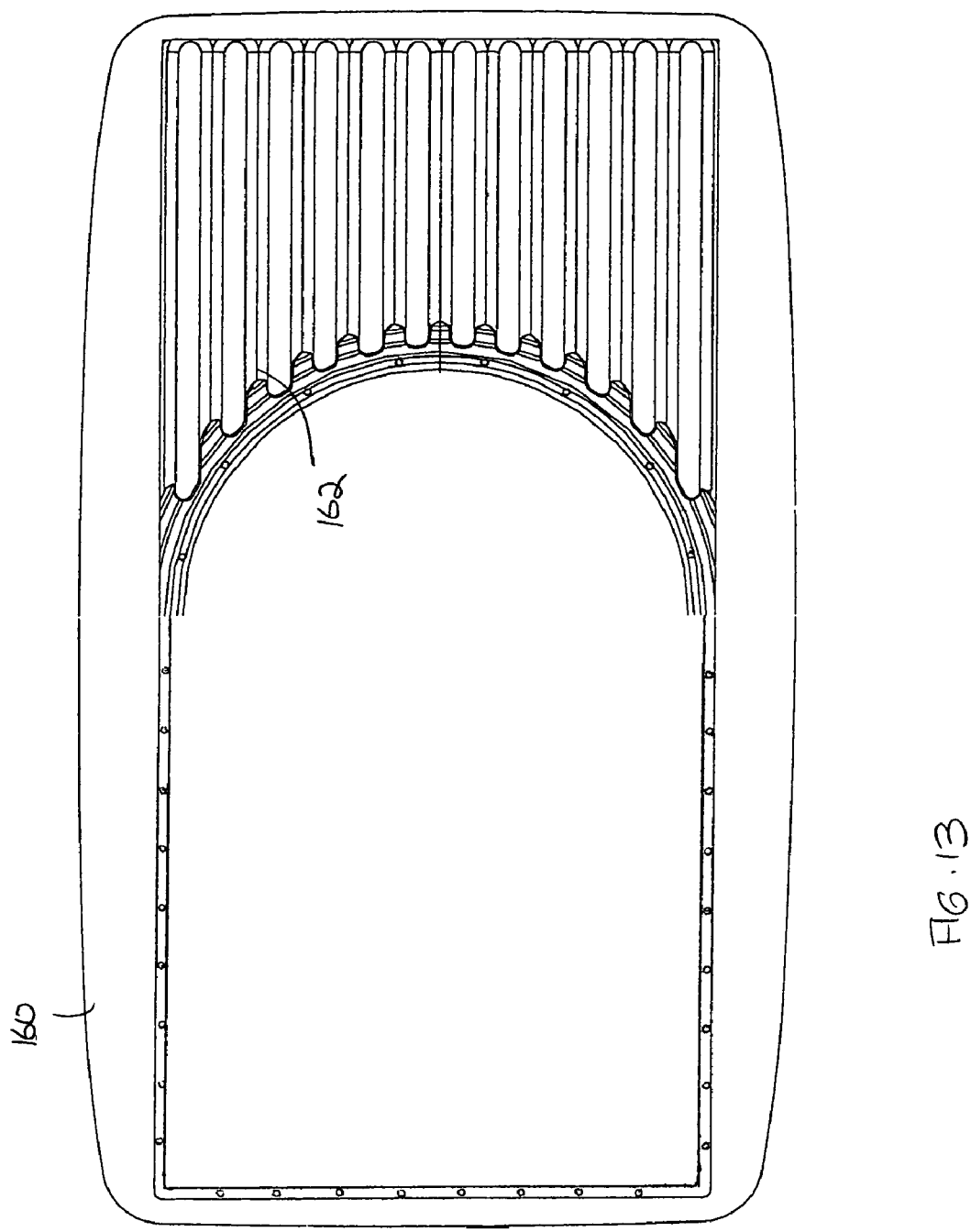
FIG. 13 shows a frame and one installed design component installed therein to form a replacement grille in accordance with the invention.
Figure 14:
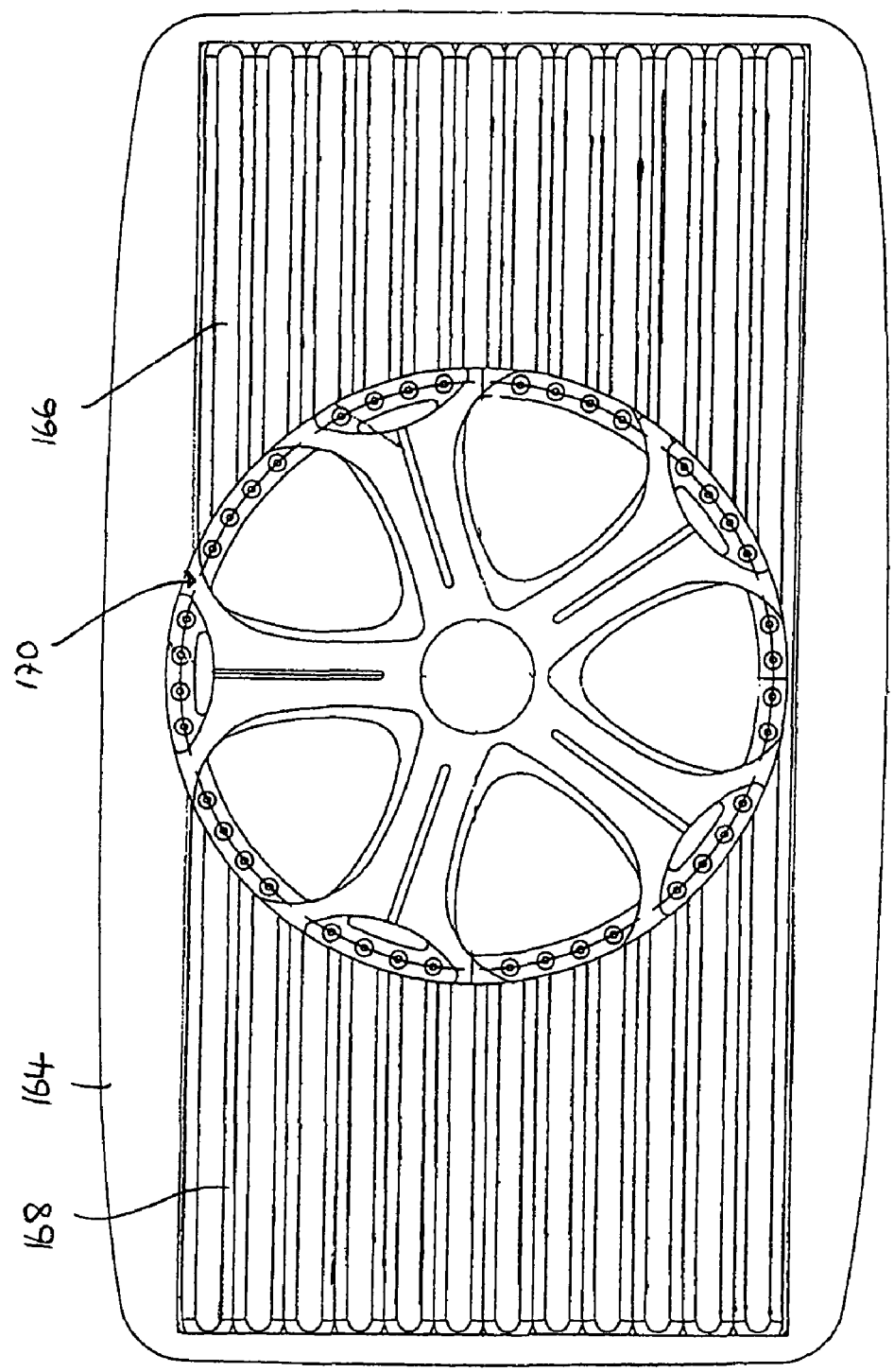
FIG. 14 shows a frame containing three interchangeable design components installed within the frame in accordance with one aspect of the replacement grille of the invention.

In FIG. 13 of the drawings, there is shown a frame 160 and one component 162, which has been installed therein. FIG. 14 shows an interchangeable replacement grille in accordance with the invention including a frame 164, a first lateral component 166, a second lateral component 168, the first and second lateral components 166 and 168 defining a circular space which is occupied or filled by the circular component 170. The various flanges and mounting screws are configured and used as described above to fasten the various components together.

Figure 15:
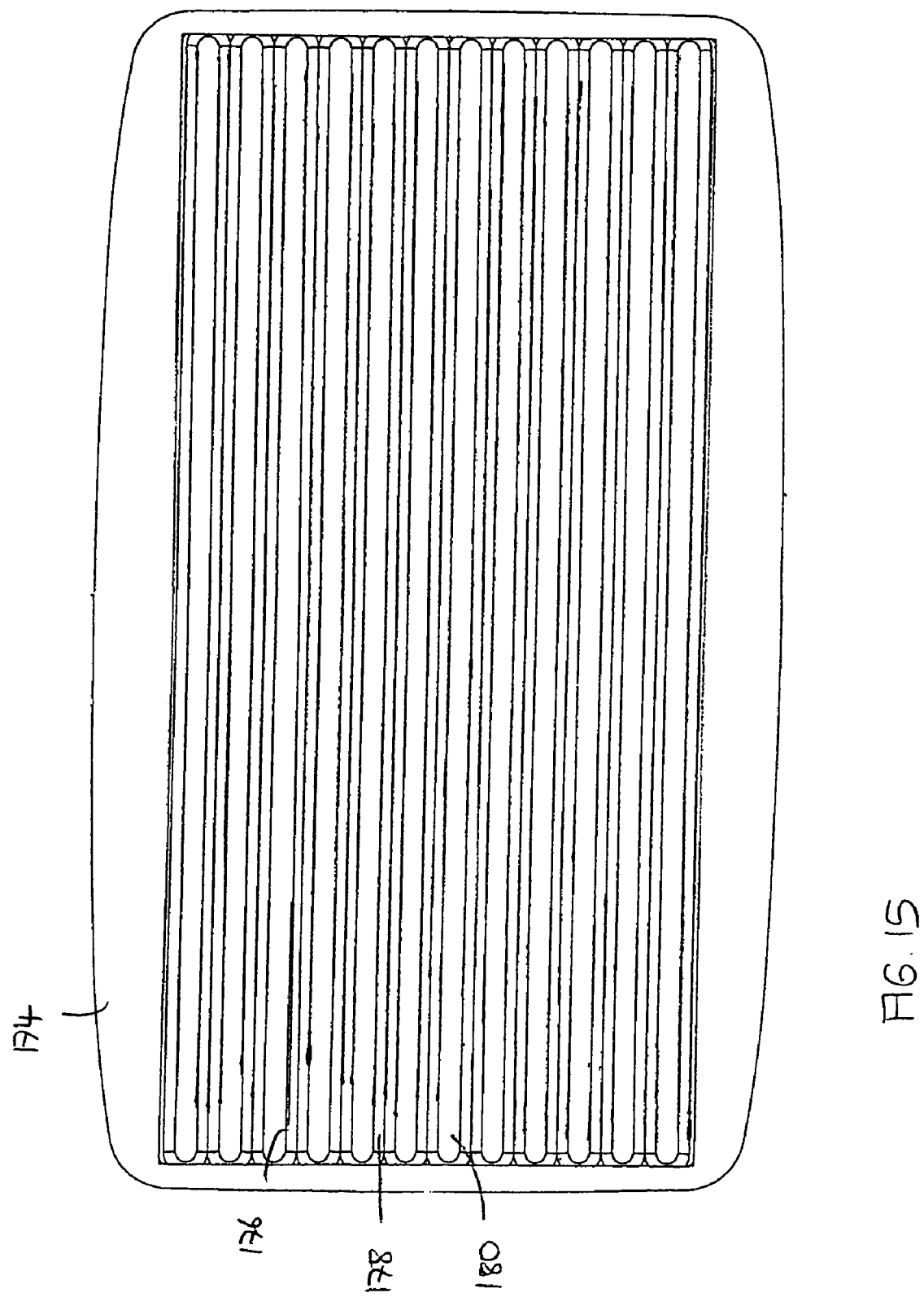
FIG. 15 shows a frame containing a single installed component in accordance with the invention.

In FIG. 15 there is shown a frame 174 and a single component 176 which fills the frame, the component 176 comprising that configuration including the plurality of horizontal slats 178 separated by spaces 180.

Figure 16:
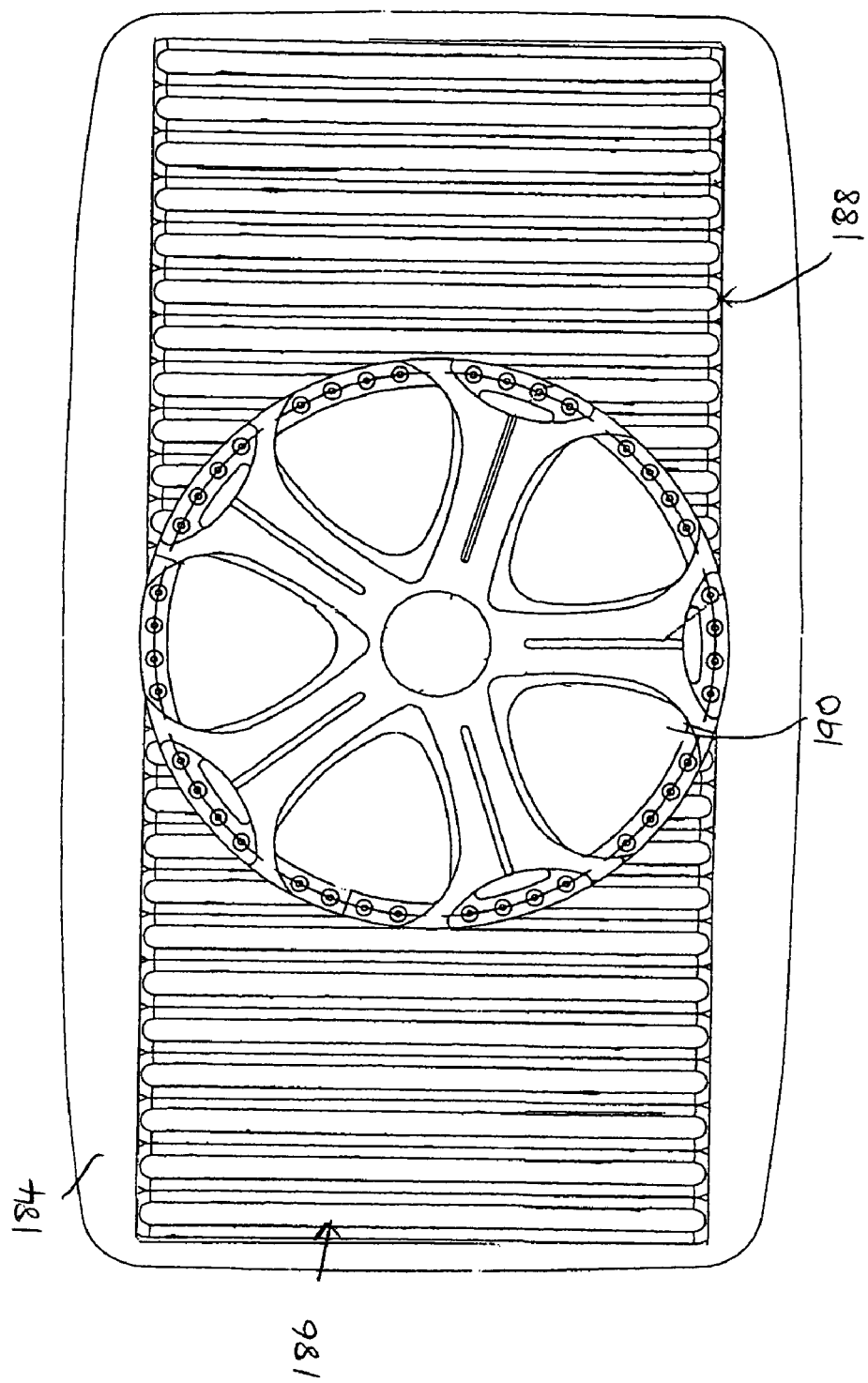
FIG. 16 shows a frame and three installed design components, showing another aspect of the grille of the invention.

In FIG. 16 there is shown yet another embodiment including a frame 184, a first lateral component 186, a second lateral component 188, the first and second lateral components 186 and 188 defining a generally circular space therebetween in which is located the circular component 190. It will be seen that the appearance of the interchangeable grille shown in FIG. 16 of the drawings is somewhat similar to that shown in FIG. 14, but whereas FIG. 14 illustrates the lateral components having a series of generally horizontal slats, the slats in FIG. 16 of the lateral components 186 and 188 are generally vertical in orientation.

Figure 17:
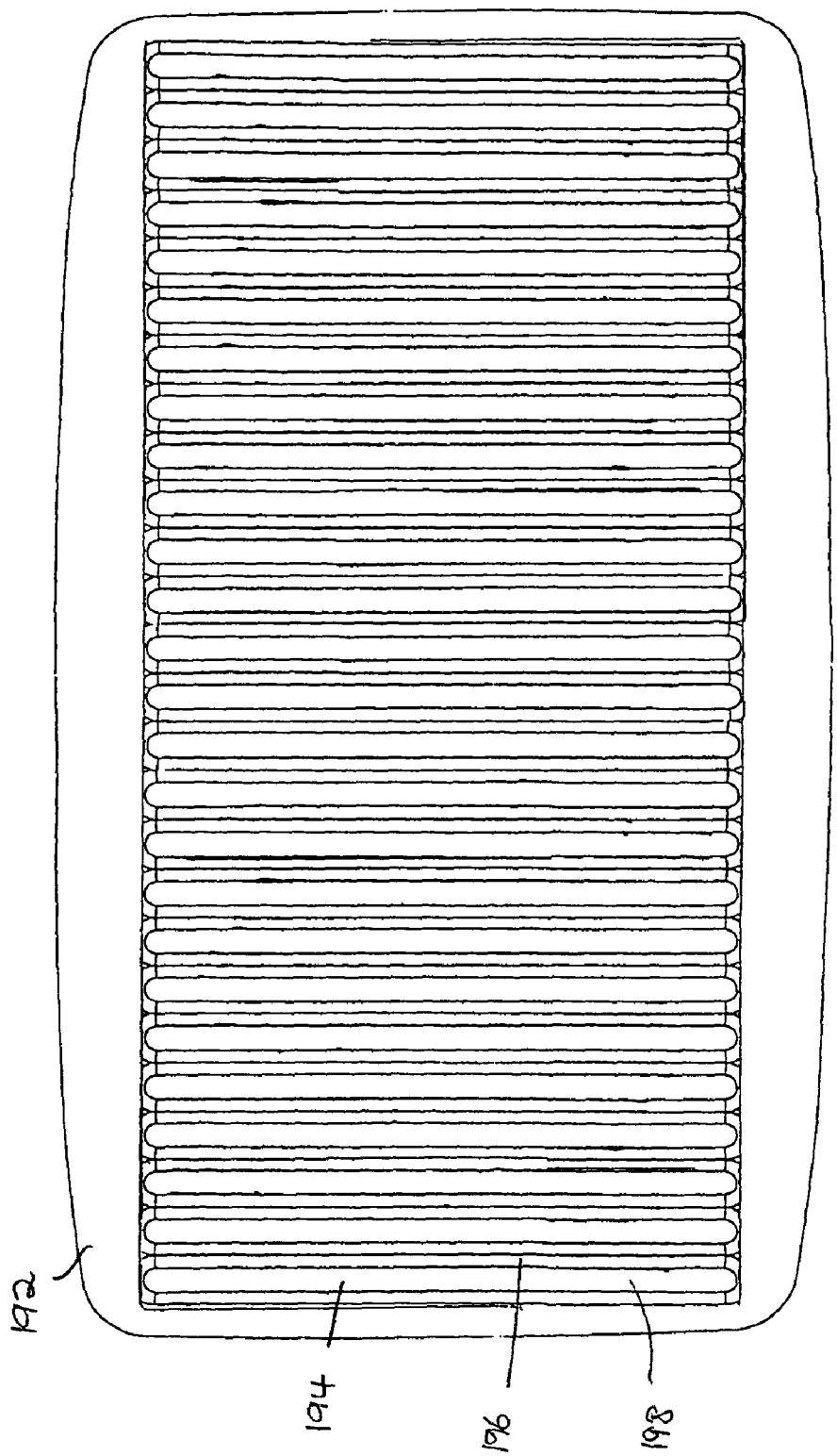
FIG. 17 is a frame with a single design component therein, in accordance with an aspect of the invention.

Finally, FIG. 17 shows yet another embodiment which includes a frame 192, and a single component 194. It will be seen that the arrangement shown in FIG. 17 is somewhat similar to that shown in FIG. 15, but the horizontal slats 178 in FIG. 15 are generally vertically oriented slats 196 in FIG. 17 of the drawings, separated by spaces 198.

From the variety of illustrations in the drawings accompanying this specification, as well as the text herein, it will be appreciated that the interchangeable replacement grille of the invention is characterized by its versatility and ability to comprise components of a wide variety of different shapes, contours, surface configurations and designs and other characteristics and features. Moreover, it is also within the scope of the invention that the various components may be connected together in many different ways, such as by the use of flanges, as illustrated, or by means of brackets, connector pieces, other forms of mounting bolts or indeed any other manner. The invention is not intended to be limited in any way by any one configuration of components, or the mechanism by means of which it can be fastened or connected to other components.

Moreover, the drawings illustrated and the text described herein typically show a single frame, which is shaped and sized so as to fit in the space or void left when the original grille is removed. However, it is certainly within the scope of this invention that more than one frame be provided, and that the frames may also interlock or fit adjacent each other so as to fill, or partially fill, that space which the original grille, now removed, has created.

Further, the components may be mixed and matched in a significant number of variations. As an example only, FIG. 16 shows two lateral components having vertical slats, together with the circular component in the middle. In other embodiments, one lateral component may have vertical slats, while the other lateral component may have horizontal (or even diagonal or angled) slats. Further, the space created when these two lateral components are assembled is circular, as shown in FIG. 16, but could be any other shape, such as rectangular, elliptical, square and the like, and a corresponding component of appropriate shape inserted therein. Furthermore, where there is a third component, such as the circular component 190 as in FIG. 16, it is not necessary that it be centrally located as shown. It can be off-center by any amount so as to be more laterally located for the desired effect.

As such, it will be appreciated that the invention is not limited to the precise details described or illustrated herein.

The invention claimed is:

1. A replacement grille for a vehicle, the replacement grille for replacing an original grille with a perimeter of the vehicle which has been removed from the vehicle, the replacement grille comprising:

a frame component having an outer edge which conforms to the perimeter of the original grille and fills in the space left by the original grille, the frame component comprising an outer frame defining an open unfilled space therein, the outer frame being a separate and distinct component from the original grille, the outer frame having the perimeter substantially corresponding to that of the original grille which it replaces and an inner perimeter;

a first design component selected from a first group of interchangeable design components each of which differ in design, the first design component having a defined shape received within and partially filling the open space of the frame component and attached to the inner perimeter of the frame component;

a second design component selected from a second group of interchangeable design components each of which differ in design, the second design component of complementary shape to the first design component in at least a portion of the unfilled space not occupied by the first design component, the second design component being attached to the first design component; and connection means on the inner perimeter connecting either or both of the first and second design components to the frame component.

2. A replacement grille as claimed in claim 1 wherein the frame component has a shape which is selected from square and rectangular.

3. A replacement grille as claimed in claim 1 wherein the frame component comprises an outer edge and an inner edge, the inner edge having an inwardly extending flange along at least a portion thereof, the inwardly extending flange providing a connector base for connecting the first design component to the frame component.

4. A replacement grille as claimed in claim 1 comprising a first lateral design component within the frame component, and a second lateral design component within the frame component.

5. A replacement grille as claimed in claim 1 further comprising a third design component located in a space defined by the first and second design components.

6. A replacement grille as claimed in claim 1 wherein at least one of the frame and/or first and second design components are plated with chrome.

7. A replacement grille as claimed in claim 1 wherein the first or second design component has a selected color.

8. A replacement grille as claimed in claim 1 wherein different design components of the first or second group of interchangeable design components have differently selected colors.

9. A replacement grille as claimed in claim 1 wherein the first design component comprises an inner flange along its entire length, the inner flange having a series of connector holes.

10. A replacement grille as claimed in claim 3 wherein the inwardly extending flange of the frame component has mounting holes therein, and the first design component has an outer flange, the outer flange having mounting holes corresponding to those mounting holes in the frame component for securing the first design component to the frame component.

11. A replacement grille as claimed in claim 1 wherein the frame component has further mounted therein an inner design component, the inner design component generally having horizontal slats separated by spaces.

12. A replacement grille as claimed in claim 1 wherein the frame component and first and second design components are respectively secured to each other by securing brackets.

13. A replacement grille as claimed in claim 1 wherein the frame component and first and second design components are secured to each other by mounting screws.

14. A replacement grille as claimed in claim 1 wherein the frame component is rectangular and comprised of four side arms connected to each other.

15. A method for installing a replacement grille for a vehicle, the replacement grille for replacing an original grille of the vehicle which has been removed from the vehicle, the replacement grille comprising:

removing the original grille of the vehicle from its location in the vehicle;

inserting a frame component in the location occupied by the removed original grille, the frame component comprising an outer frame defining an open unfilled space therein, the outer frame being a separate and distinct component from the original grille, the outer frame having an outer perimeter substantially corresponding to that of the original grille which it replaces and an inner perimeter;

inserting a first design component selected from a first group of interchangeable design components each of which differ in design, the first design component having a decorative element thereto in and partially filling the open space of the frame component and attaching the first design component to the inner perimeter of the frame component; and inserting a second design component selected from a second group of interchangeable design components each of which differ in design, the second design component in at least a portion of the unfilled space not occupied by the first design component, the second design component being attached to the first design component.

* * * * *